US006177865B1

United States Patent
Bryant et al.

(10) Patent No.: US 6,177,865 B1
(45) Date of Patent: Jan. 23, 2001

(54) DUAL OPERATIONAL AND BRAKE LIGHT CONTROL FOR TRAILERS

(75) Inventors: Richard C. Bryant, Acacto, CA (US); Richard Johnson, Tecumseh, MI (US)

(73) Assignee: MasoTech, Inc., Taylor, MI (US)

( * ) Notice: Under 35 U.S.C. 154(b), the term of this patent shall be extended for 0 days.

(21) Appl. No.: 09/097,270

(22) Filed: Jun. 15, 1998

Related U.S. Application Data

(60) Provisional application No. 60/049,715, filed on Jun. 16, 1997.

(51) Int. Cl.[7] .................................................. G08B 21/00
(52) U.S. Cl. ........................... 340/431; 307/10.8; 315/77; 315/82; 340/475
(58) Field of Search .................................... 340/475, 431, 340/465, 479; 307/10.8; 315/77, 82

(56) References Cited

U.S. PATENT DOCUMENTS

| | | | |
|---|---|---|---|
| 3,872,424 | * | 3/1975 | Enabnit . |
| 3,970,860 | * | 7/1976 | Purdy .................................. 340/475 |
| 4,006,453 | * | 2/1977 | Bryant ................................. 340/475 |
| 4,232,910 | * | 11/1980 | Snyder ................................... 303/96 |
| 4,751,431 | * | 6/1988 | Ducote ................................ 340/475 |
| 4,857,807 | * | 8/1989 | Hargis ................................. 340/431 |
| 5,498,910 | * | 3/1996 | Hopkins et al. ..................... 340/687 |
| 5,521,466 | * | 5/1996 | Vincent ............................... 340/475 |
| 5,701,116 | * | 12/1997 | Hoekstra ............................. 340/431 |

\* cited by examiner

*Primary Examiner*—Brent A. Swarthout
(74) *Attorney, Agent, or Firm*—Reising, Ethington, Barnes, Kisselle, Learman & McCulloch, PC

(57) ABSTRACT

A dual operational and stop light control for adapting combined stop and turn signal lights on a trailer to independent stop signal and turn signal lights on a towing vehicle. The adaptor has a pair of switching circuits, each including a PNP transistor connected in series with an NPN transistor to chassis ground and each transistor connected to both stop and turn signal circuits of the towing vehicle and also to an NPN output transistor which is connected to an independent voltage source to drive the trailer signal lights independent of the voltage at the towing vehicle signal lights.

7 Claims, 1 Drawing Sheet

DUAL OPERATIONAL AND BRAKE LIGHT CONTROL FOR TRAILERS

This application claims the benefit of provisional application Ser. No. 60/049,715 filed Jun. 16, 1997.

BACKGROUND OF THE INVENTION

The present invention relates to electronic adaptor circuits which convert combined stop and turn signal lights of a trailer to operate in response to the independent stop and turn signal lights on a towing vehicle. Such devices are well known. Examples of trailer light adaptors are disclosed in U.S. Pat. Nos. 4,005,313; 4,057,310; 4,270,115; 4,405,190; 4,718,853; 4,842,524 and 4,939,503. Some of these patents disclose a circuit for adapting a three lamp system of a towing vehicle to a two lamp system of the trailer. Other patents such as U.S. Pat. Nos. 3,849,664; 3,883,845; 3,970,860; 4,006,453; 4,064,413; 4,325,052; 4,751,431; 5,030,938; 5,212,469 and 5,701,116 disclose trailer light converter systems having certain advantages. For example, U.S. Pat. No. 4,006,453 discloses a converter circuit which adapts a two lamp trailer signal light system to a three lamp towing vehicle system. In this device and others the power to drive the trailer signal lights is provided by the towing vehicle stop and turn signal lights which also serve as ground for the logic circuit. Such a design requires a complex diode isolation network. However, if the towing vehicle lights are missing or defective the logic of the converter will be defeated. Furthermore, the requisite diode isolation network in combination with output transistors, significantly reduce the power output to the trailer signal lights. In addition, many current vehicle lighting circuits employ sensors to detect defective signal lights. Connecting such signal lights to provide power to trailer signal lights causes a significant drain on the towing vehicle lights which can cause disruption of the defective lamp sensors and faulty indications.

SUMMARY OF THE INVENTION

The primary object of the present invention is to provide a battery powered adaptor which enables a trailer having combined stop and turn signal light systems to be towed behind a vehicle having independent stop and turn light systems.

Another object of the invention is to provide a device having means for de-activating the stop signal lamp on one side of the trailer when the turn signal on that side is being operated.

A further object of the invention is to provide power to the trailer lights directly from a 12.5 volt battery, thus isolating the signal lamps of the towing vehicle from the signal lamps of the trailer.

A yet further object of the invention is to eliminate the need for a complex diode network and to properly operate the trailer signal lights independent of the condition of the towing vehicle signal lights in a simplified circuit for enhanced reliability.

Another object of the invention is to prevent defective lamp sensors in the towing vehicle from malfunctioning as the result of excessive current drain at the towing vehicle signal lights.

These and other objects and advantages of the invention will become apparent to those skilled in the art from the following detailed description of the invention with reference to the attached drawing.

DESCRIPTION OF THE PREFERRED EMBODIMENT

Figure 1:
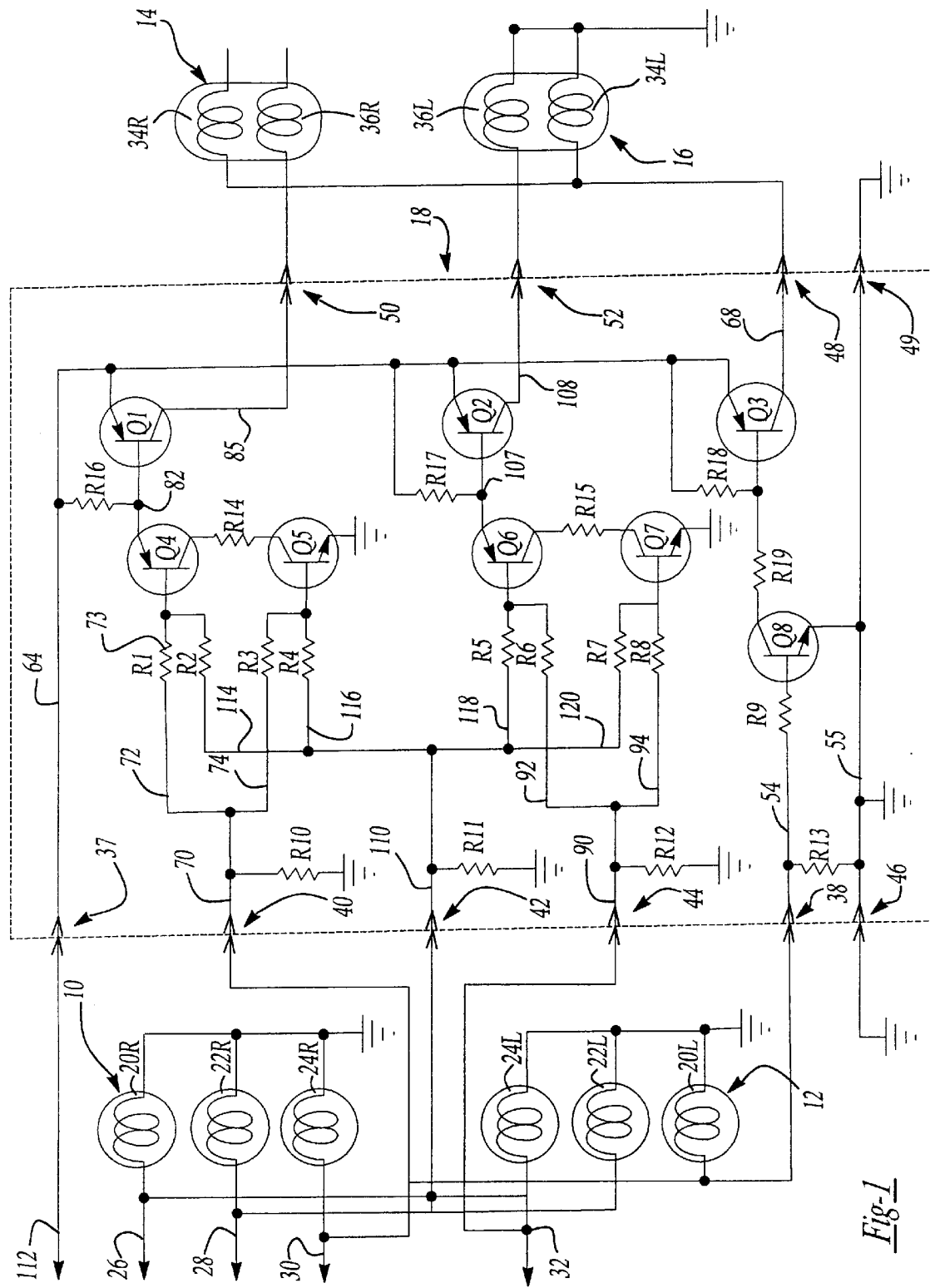
FIG. 1 is an electric schematic diagram of the preferred embodiment of the adaptor of the present invention.

In the embodiment of the invention shown in FIG. 1, reference numeral 10 designates the group of right-hand signal lights for the towing vehicle, while reference numeral 12 designates the left-hand signal lights. Reference numeral 112 designates the voltage source such as a 12.5 volt towing vehicle battery. The right-hand signal light of the trailer is shown at 14, and the left-hand signal light of the trailer is designated by the numeral 16. Reference numeral 18 designates, in its entirety, the adaptor device of the present invention, which enables the lights of the trailer to be actuated in a legal manner by the brake signal and turn signal circuits of the towing vehicle, as will be described hereinafter.

The signal lights of the towing vehicle consist of two groups 10, 12 of three each with each group being arranged on the opposite sides of the towing vehicle at the rear end thereof. Lights 20R and 20L are the taillights (or clearance lights) on the right-hand and left-hand sides of the towing vehicle, respectively. Lights 22R and 22L are the brake or stop signal lights on the right and left sides of the towing vehicle, respectively. Lights 24R and 24L are the right turn and left turn signal lights, respectively, of the towing vehicle. The clearance lights 20R and 20L are connected to the light circuit 26 of the towing vehicle which causes the lights to go on when the headlights are activated. Stop signal lights 22R and 22L are connected to a brake or stop signal light circuit 28, and both of these lights go on simultaneously when the brakes are actuated. Right turn signal light 24R is connected to right turn signal circuit 30, and left turn signal light 24L is connected to left turn signal circuit 32, so that the appropriate signal light is caused to flash when the turn signal lever is actuated.

The system shown in the drawing wherein the right-hand and left-hand signal lights 10 and 12 each have three separate lamps or three separate filaments, each of which has a separate function. Most trailers have the stop and turn signals applied to a common filament of a combination signal light. Thus, most trailers have only two separate lamps, as generally indicated at 14 and 16 in the drawing. These two systems are electrically incompatible, and some modification of the system(s) must occur if the lighting systems are to be operated in a legal manner. This is accomplished in the present invention by the adaptor device 18 which creates a stop signal inhibiting action in the signaling circuit which is normally provided in the electrical system of a towing vehicle having independent stop and turn functions.

In the trailer lights 14 and 16 there are two lamps arranged on opposite sides of the trailer, each of which has two filaments. Filaments 34R and 34L are the clearance light filaments, which light up simultaneously when the towing vehicle headlights are switched on. Filament 36R is a common stop and right turn signal for the right-hand light 14, while filament 36L is the common stop and left turn signal for the left-hand light 16.

The adaptor device 18 preferably is housed in a weatherproof enclosure and has six input connections 37, 38, 40, 42, 44 and 46, each of which is a direct electrical connection to corresponding circuits on the towing vehicle. Output connections 48, 50 and 52 are provided which permit connection to the signal lights 14, 16 of the trailer.

Input connection 37 is connected directly to the voltage source 112,which is 12.5 volt battery of the towing vehicle. Input connector 46 is connected to the towing vehicle ground. Input connection 40 is connected to the right turn signal circuit 30. Input connection 42 is connected to the stop signal light circuit 28. Input connector 44 is connected to the left turn signal circuit 32, and input connection 38 is connected to the clearance light circuit 26.

Output connection 48 provides for connection to the clearance light filaments 34R, 34L of the trailer signal lamp 14, 16, respectively. Output connection 50 is connected to the common brake/turn signal filament 36R of the trailer signal light 14. Output connection 52 is connected to the common brake/turn signal filament 36L of the trailer signal light. Output connection 49 provides a connection to the trailer ground.

Electrical line 54 within the adaptor device circuit 18 connects the input connection 38 to both ground via resistor R13 between line 54 and line 55 and to the base of an NPN transistor Q8 through resistor R9. The emitter of transistor Q8 is connected to ground via line 55. The collector of transistor Q8 is connected through resistor R19 to the base of a PNP output transistor Q3 whose emitter is connected to the 12.5 volt input connection 37 via line 64. Resistor R18 is connected between the base and emitter of output transistor Q3. The collector of output transistor Q3 is connected via line 68 to output connection 48, and in turn to the light filaments 34R and 34L of trailer signal lamps 14 and 16, respectively.

Line 70 connects to input connection 40, which goes to the right turn signal circuit 30 of the towing vehicle. Line 70 connects to chassis ground via resistor R10. Line 70 also connects to branch lines 72, 74. Line 72 is connected via resistor 73 to the base of a PNP transistor Q4. Line 74 is connected via resistor R3 to the base of an NPN transistor Q5 whose emitter is connected to ground. Resistor R14 is connected between the collectors of transistors Q4 and Q5. The emitter of transistor Q4 is connected via line 82 to the base of a PNP output transistor Q1. The emitter of output transistor Q1 is connected via line 64 to the input connection 37. Resistor R16 is connected between line 64 and line 82. The collector of output transistor Q1 is connected via line 88 to the output connection 50 which goes to the common brake/turn signal filament 36R of the trailer signal light 14.

Line 90 connects to input connection 44, which goes to the left turn signal circuit 32 of the towing vehicle. Line 90 connects to chassis ground via resistor R12. Line 90 also connects to branch lines 92, 94. Line 92 is connected via resistor R6 to the base of a PNP transistor Q6. Line 94 is connected via resistor R8 to the base of a NPN transistor Q7 whose emitter is connected to chassis ground. Resistor R15 is connected between the collectors of transistors Q6 and Q7. The emitter of transistor Q6 is connected via line 102 to the base of a PNP output transistor Q2. The emitter of output transistor Q2 is connected via line 64 to the input connection 37. Resistor R17 is connected between line 64 and line 102. The collector of output transistor Q2 is connected via line 108 to the output connection 52 which goes to the common brake/turn signal filament 36L of the trailer signal light 16.

Line 110 connects to input connection 42, which goes to the stop signal light circuit 28 of the towing vehicle. Line 110 connects to chassis ground via resistor R11. Line 110 also connects to branch lines 114, 116, 118 and 120. Line 114 connects via resistor R2 to the base of transistor Q4. Line 116 connects via resistor R4 to the base of transistor Q5. Line 118 connects via resistor R5 to the base of transistor Q6. Line 120 connects via resistor R7 to the base of transistor Q7.

In the quiescent mode with no lights activated on the towing vehicle the output transistors Q1 (right stop and turn), Q2 (left stop and turn), and Q3 (clearance lights) are all emitter-connected directly to the 12.5 volt battery 112 via line 64, but are biased off in this mode, respectively, by resistors R16, R17 and R18.

When the towing vehicle clearance lights are activated, a clearance light signal appears on line 26 and a voltage is applied via connector 38 and line 54 and through resistor R9 to the base of transistor Q8. This in turn switches transistor Q8 "on" providing a path to chassis ground for resistor R19 allowing base current to flow in transistor Q3. Transistor Q3 thus applies power directly from the 12.5 volt battery to the clearance lights 34R and 34L on the trailer via line 68 output connection 48.

A right turn signal appearing at line 30 will be presented to device 18 at input connection 40. This causes base current to flow in transistor Q5 through resistor R3, switching Q5 "on". Base current also flows in transistor Q4 through resistor R2 to lines 114, 110 and input connection 42, the stop input line, through lamps 22R and 22L to ground. This in turn allows base current to flow in output transistor Q1 via transistor Q4, resistor R14 and transistor Q5 to chassis ground, applying power to the output connection 50 which will flash the right trailer lamp 36R in sync with the right turn input signal at line 30.

A stop signal appearing at line 28 will be presented to device 18 at input connection 42. This causes base current to flow in transistors Q5 and Q7 through resistors R4 and R7, respectively, switching transistors Q5 and Q7 to "on". Base current also flows in transistors Q4 and Q6 through resistors R1 back through input connection 40, line 30 and lamp 24R to ground, and through transistor Q6, resistor R6, back ground input connection 44, line 32 and lamp 24L to ground, respectively. Thus, base current flows in output transistor Q1 through transistor Q4, resistor R14, and transistor Q5 to chassis ground, and in output transistor Q2 through transistor Q6, resistor R15, and transistor Q7 to chassis ground, thus applying power to both output connections 50 and 52 and illuminating stop lamps 36R and 36L.

A left turn signal appearing at line 32 will be presented to device 18 at input connection 44. This causes base current to flow in transistor Q7 through resistor R8, thereby switching Q7 "on". Base current also flows in transistor Q6 through resistor R5, lines 118 and 110 to input connection 42, the stop input line 28, through lamps 22R and 22L to ground. Thus, base current will flow in output transistor Q2 through transistor Q6, resistor R15, and transistor Q7 to chassis ground, thereby applying power to the output connection 52 which will flash the left trailer lamp 36L in sync with the left turn signal on line 32.

A stop signal and right turn signal appearing simultaneously at lines 28 and 30 will be presented to device 18 at input connections 40 and 42. Transistor Q4 will have no base current because all paths to ground are blocked through resistors R1 and R2, thus denying base current to output transistor Q1, shutting it "off" when a right turn signal coincides with a stop signal. The trailer lamp 36R will cancel 180 degrees opposite the towing vehicle right turn signal at line 30. Output transistor Q2 is unaffected and continues to illuminate trailer lamp 36L as a stop signal.

A stop signal and left turn signal appearing simultaneously at lines 28 and 32 will be presented to device 18 at input connections 42 and 44. Transistor Q6 will have no base current because all paths to ground are blocked through resistors R5 and R6, thus denying base current to output transistor Q2, shutting it "off" when the left turn signal on line 32 coincides with a stop signal on line 28. The trailer lamp 36L will cancel 180 degrees opposite the towing vehicle left turn signal on line 32. Output transistor Q1 is unaffected and continues to illuminate trailer lamp 36R as a stop signal.

Thus the dual operational and brake light control device 18 of the present invention operates via transistor pairs Q4, Q5 and Q6, Q7 each of which is a unique combination of a PNP transistor and an NPN transistor connected in series with the base resistor of an associated output transistor to function as an EXCLUSIVE "OR" gate as summarized in the following tables:

| Stop Input | Right Turn Input | Q4 | Q5 | Q1 Output |
|---|---|---|---|---|
| LOW | LOW | ON | OFF | LOW |
| HI | LOW | ON | ON | HI |
| LOW | HI | ON | ON | HI |
| HI | HI | OFF | ON | LOW |

| Stop Input | Left Turn Input | Q6 | Q7 | Q2 Output |
|---|---|---|---|---|
| LOW | LOW | ON | OFF | LOW |
| HI | LOW | ON | ON | HI |
| LOW | HI | ON | ON | HI |
| HI | HI | OFF | ON | LOW |

The adaptor device of the present invention enables the trailer lamps to be provided with greater power by virtue of its operation directly from the towing vehicle battery. Furthermore, because the adaptor device draws less than 50 milliamperes from the towing vehicle lamps, there is no disruption to any defective lamp sensors that may be present in the towing vehicle circuitry.

The foregoing detailed description of the preferred embodiment of the present invention clearly illustrates that it fulfills the objects of the invention. It will be understood that those skilled in the art may make various modifications or additions to the preferred embodiment described in detail to illustrate the present invention without departing from the spirit and scope of the following claims including all equivalents.

We claim:

1. A device for adapting combined brake and turn signal lights of a trailer to independent brake and turn signal lights on an associated towing vehicle, the towing vehicle having right and left turn signal circuits and a stop signal circuit, the trailer having right-hand and left-hand signal lights, each of which has a common filament for stop and turn signals, the device comprising:
   first switching means connected to both the right turn signal circuit and to the stop signal circuit of the towing vehicle, a voltage source being connected directly to the first switching means independent of the turn signal circuits;
   second switching means connected to both the left turn signal circuit and the stop signal circuit of the towing vehicle, the voltage source connected directly to the second switching means independent of the turn signal circuits;
   each of the first and second switching means operating as an exclusive "or" gate to connect the voltage source to the associated one of the common filaments of the trailer lights when only one, but not both, of the stop signal and the turn signal circuits is energized; and
   each of said switching means comprising a PNP transistor and an NPN transistor connected in series, each of said transistors also connected to both said stop signal circuit and one of said turn signal circuits, and a PNP output transistor connected with said transistors, said output transistor also connected to said independent voltage source.

2. A device for adapting combined stop and turn signal lights of a trailer to independent brake signal and turn signal lights on an associated towing vehicle, the towing vehicle having right and left turn signal circuits and a stop signal circuit, the trailer having right-hand and left-hand signal lights, each of which has a common filament for stop and turn signals, said device comprising:
   a first switch configured to be connected to both the right turn signal circuit and to the stop signal circuit on the vehicle, and also configured to be connected to the right-hand turn-and-stop signal light on the trailer;
   a second switch configured to be connected to both the left turn signal light and to the stop signal circuit on the vehicle, and also configured to be connected to the left-hand turn-and-stop signal light on the trailer;
   said first and second switches configured to connect directly to a voltage source rather than connecting to the voltage source through the stop signal or turn signal lights of the towing vehicle;
   said first and second switches each being operable to transmit current directly from the voltage source to the respective right and left turn-and-stop signal lights on the trailer when only one of the corresponding signal circuits on the towing vehicle is operating; and
   each of said switches being operable, responsive to signals from both the stop signal circuit and the corresponding turn signal circuit on the towing vehicle to switch current from the independent voltage source alternately on and off to the associated turn-and-stop signal light of the trailer, when both the brakes and turn signal circuits are operating; and
   each of the switches comprising a PNP transistor and an NPN transistor connected in series, each of the transistors also connected to both the stop signal circuit and one of the turn signal circuits, and a PNP output transistor connected with the transistors, the output transistor also connected to the independent voltage source.

3. A device for adapting combined stop and turn signal lights of a trailer to independent brake signal and turn signal lights on an associated towing vehicle, the towing vehicle having right and left turn signal circuits and a stop signal circuit, the trailer having right-hand and left-hand signal lights, each of which has a common filament for stop and turn signals, said device comprising:
   a first switch configured to be connected to the right turn and stop signal circuits of the towing vehicle and to a voltage source and further configured to transmit current directly from the voltage source to the right turn and stop signal circuits of the trailer without drawing that current through the right turn and stop signal circuits of the towing vehicle;
   a second switch configured to be connected to both the left turn and stop signal circuits of the towing vehicle and to the voltage source and further configured to transmit current directly from the voltage source to the left turn and stop signal circuits of the trailer without drawing that current through the left turn and stop signal circuits of the towing vehicle;
   each of the first and second switches operating as an exclusive "or" gate to connect the voltage source to the associated one of the common filaments of the trailer lights when only one, but not both, of the stop signal and the turn signal circuits is energized; and
   each of the switches comprising a PNP transistor and an NPN transistor connected in series, each of the transistors also connected to both the stop signal circuit and one of the turn signal circuits, and a PNP output transistor connected with the transistors, the output transistor also connected to the independent voltage source.

4. An electrical circuit adapter for use between a towing vehicle lighting system having independent brake and turn signal lamps and a trailer lighting system having combined brake and turn signal lamps, the circuit adapter comprising:

> first and second vehicle signal inputs configured to receive respective electrical signals from the towing vehicle lighting system each signal representing the state of a particular towing vehicle lamp;
>
> a power supply input connectable to a power source for receiving a power input signal;
>
> a first transistor having a first terminal coupled to the first and second signal inputs, a second terminal coupled to the power supply input, and a third terminal;
>
> a second transistor having a first terminal coupled to the first and second signal inputs, a second terminal, and a third terminal coupled to ground;
>
> a third transistor having a first terminal, a second terminal coupled to the power supply input, and a third terminal; and
>
> a trailer signal output coupled to the third terminal of the third transistor and configured to transmit a power signal from the circuit adapter to the trailer lighting system;
>
> wherein the third terminal of the first transistor is coupled to the second terminal of the second transistor forming a series connection, the series connection being coupled to the first terminal of the third transistor such that the signal output is coupled to the power supply input only when one of the first and second signal inputs are high, but not both.

5. The electrical circuit adapter as defined in claim 4, wherein the circuit adapter is configured such that both the first and second transistors must have an available current path between their respective first terminals and one of the signal inputs for the circuit adapter to couple the power supply input to the signal output.

6. The electrical circuit adapter as defined in claim 4, wherein one of the signal inputs is representative of the vehicle brake signal and another is representative of one of the vehicle turn signals.

7. The electrical circuit adapter as defined in claim 4, wherein the series connection comprises an PNP and an NPN transistor.

* * * * *